United States Patent [19]

Wyman

[11] Patent Number: 5,053,795
[45] Date of Patent: Oct. 1, 1991

[54] REUSABLE CARTRIDGE FOR STORING AND DISPENSING LIGHT SENSITIVE WEB MATERIAL

[75] Inventor: Stuart J. Wyman, St. Paul, Minn.

[73] Assignee: Minnesota Mining and Manufacturing Company, St. Paul, Minn.

[21] Appl. No.: 609,376

[22] Filed: Nov. 5, 1990

[51] Int. Cl.⁵ .................... G03B 17/26; B65H 16/00
[52] U.S. Cl. .................... 354/275; 242/71.1; 206/409
[58] Field of Search .............. 354/275; 242/71.1, 71.8, 242/71.7; 206/408, 409

[56] References Cited

U.S. PATENT DOCUMENTS

| | | | |
|---|---|---|---|
| 3,945,584 | 3/1976 | Mangan | 242/71.1 |
| 4,068,247 | 1/1978 | Bouwen et al. | 354/275 |
| 4,403,845 | 9/1983 | Buelens et al. | 354/276 |
| 4,455,076 | 6/1984 | Birkeland | 354/275 |
| 4,482,232 | 11/1984 | Engelsmann et al. | 354/275 |
| 4,597,658 | 7/1986 | Buelens | 354/275 |
| 4,616,914 | 10/1986 | Buelens | 354/277 |
| 4,733,777 | 3/1988 | Van Gayte et al. | 296/316 |
| 4,889,292 | 12/1989 | Loewe et al. | 242/71.1 |
| 4,956,908 | 9/1990 | Morse et al. | 242/71.1 X |

Primary Examiner—A. A. Mathews
Attorney, Agent, or Firm—Kinney & Lange

[57] ABSTRACT

An opaque cartridge for storing and dispensing light sensitive web materials from a roll includes a box defining a right angular sexahedron and made up of a top section and a bottom section hingedly connected to each other at an upper rear edge of the box and providing a straight light-tight exit slot at a lower front edge of the box, and a spool consisting of a cylindrical hub on which the web material is wound and a pair of discoid end flanges concentric with the hub. The hub is rotatably mounted in openings provided in split end walls of the box. Light blocking and trapping flanges, baffles, plates, ledges, bars, recesses, and light steps are provided in conjunction with the hinge connection between the top and bottom box sections, the mating connections between the top and bottom end walls, and along the edge of the box providing the exit slot to the end that no light can enter the chamber provided by the box and spool of the cartridge.

18 Claims, 9 Drawing Sheets

REUSABLE CARTRIDGE FOR STORING AND DISPENSING LIGHT SENSITIVE WEB MATERIAL

BACKGROUND OF THE INVENTION

This invention has relation to cartridges, cassettes and light-tight packages of rolls of light-sensitive material. Particularly, the invention has relation to a cartridge which can be useful for storing and dispensing light-sensitive web materials. The invention also has relation to cartridges into which light-sensitive web materials can be conveniently and safely loaded and reloaded as many times as desired in conditions of extremely low light or no light at all.

It is well known to store rolls of web-like, light-sensitive, photographic materials in light-tight cassettes and for dispensing the material through a slit in the cassette. See U.S. Pat. No. 4,733,777 granted to Van Gayte et al on Mar. 29, 1988; U.S. Pat. No. 4,597,658 granted to Buelens et al on July 1, 1986; U.S. Pat. No. 4,482,232 granted to Engelsmann et al on Nov. 13, 1984; U.S. Pat. No. 4,455,076 granted to Birkeland on June 19, 1984, and U.S. Pat. No. 4,403,845 granted to Buelens et al, on Sept. 13, 1983, for example.

It is known to make such cassettes to include two interlocking half-cylindrical segments supporting a spool of photo sensitive material on bearings provided by those interlocking segments, and to provide a light slit or slot having strips of light-excluding compressible material such as velvet or felt ribbon to line the slot to prevent any light leak back through the slot into the cassette or cartridge. See U.S. Pat. No. 4,616,914 granted to Buelens on Oct. 14, 1986; U.S. Pat. No. 4,068,247 granted to Bouwen et al on Jan. 10, 1978; and U.S. Pat. No. 3,945,584 granted to Mangan on Mar. 23, 1976.

Most of the film storage rolls, cassettes and cartridges developed before the present invention were either designed to fit into cavities, in particular, cameras or were designed to simply hold the material for later loading into a camera. Such structures have caused greater or lesser difficulties over the years in getting the photographic materials into such cameras either in such cassettes and cartridges or in moving the photographic material from the light-tight packaging into the camera. Much of the prior art deals with cassettes or cartridges which are designed for but a single use, and, therefore, were often made of light and inexpensive materials to cut down the initial cost and reduce the amount of waste involved in discarding them after such use.

What was needed before the present invention was a compact sturdy cartridge, designed to be used in industrial and commercial handling and processing of relatively wide light-sensitive web materials; which cartridge can be recycled, reloaded and reused indefinitely; and into which light-sensitive web material can easily be loaded and/or reloaded in conditions of very low light or of no light at all.

SUMMARY OF THE INVENTION

An opaque dispenser cartridge provides a light-tight chamber from which to dispense a roll of light sensitive web material. The cartridge has (1) a spool including a cylindrical hub initially supporting a roll of material to be dispensed and a pair of discoid end flanges concentric with the hub, one positioned at each end of the roll, and (2) a hollow box encompassing the spool, the box being provided with a straight, light-tight exit slot through which the web material can be dispensed from the spool.

In the cartridge of the invention, the outside dimensions of the box define a right angular polyhedron and the box is made up of a top section and a bottom section defining the light-tight exit slot along a first side edge of the box. The top and bottom sections are connectable to each other to form a light-tight seal along an oppositely positioned second side edge of the box.

Each section is provided with side wall means of size and configuration to encompass about one-half of the spool and each section includes a pair of end walls, an end wall of each pair being integrally connected to one end of the side wall means of its section, every end wall being in position and of configuration to mate with a corresponding end wall of the other section to form a light-tight seal serving as part of the enclosure of the light-tight chamber.

Means is provided in the box to support the spool within the chamber to position and maintain the longitudinal axis of the spool hub in parallel relation to the straight exit slot.

In the form of the invention as shown, means is provided to hold the two sections together to prevent light reaching the inside of the cavity to act upon the roll of web material on the spool after the spool and the top and bottom sections of the box have been fully assembled.

Interlocking elements of the top section with the bottom section are provided to form light seals and light traps along the connection of the two sections together, along the exit slot, and along the end walls and discoid flange surfaces to render the interior chamber of the cartridge as a light-tight chamber.

DETAILED DESCRIPTION OF THE PREFERRED EMBODIMENT

A dispenser cartridge 10 includes a spool 12 of opaque material made up of a hollow cylindrical hub 14 and a pair of discoid end flanges 16,16, each extending outwardly from an end portion of the hub in a plane perpendicular to the axis of the hub. The cartridge 10 also includes a hollow box 18 of opaque material encompassing the spool 12. The box is provided with a longitudinally extending light-tight exit slot 20 along a first side edge 21 thereof. A web material 22 such as an elongate strip of light sensitive photographic film is wound in a roll 24 about the hub 14 of the spool 12 and can be dispensed through exit slot 20.

Figures 2, 4, 12:
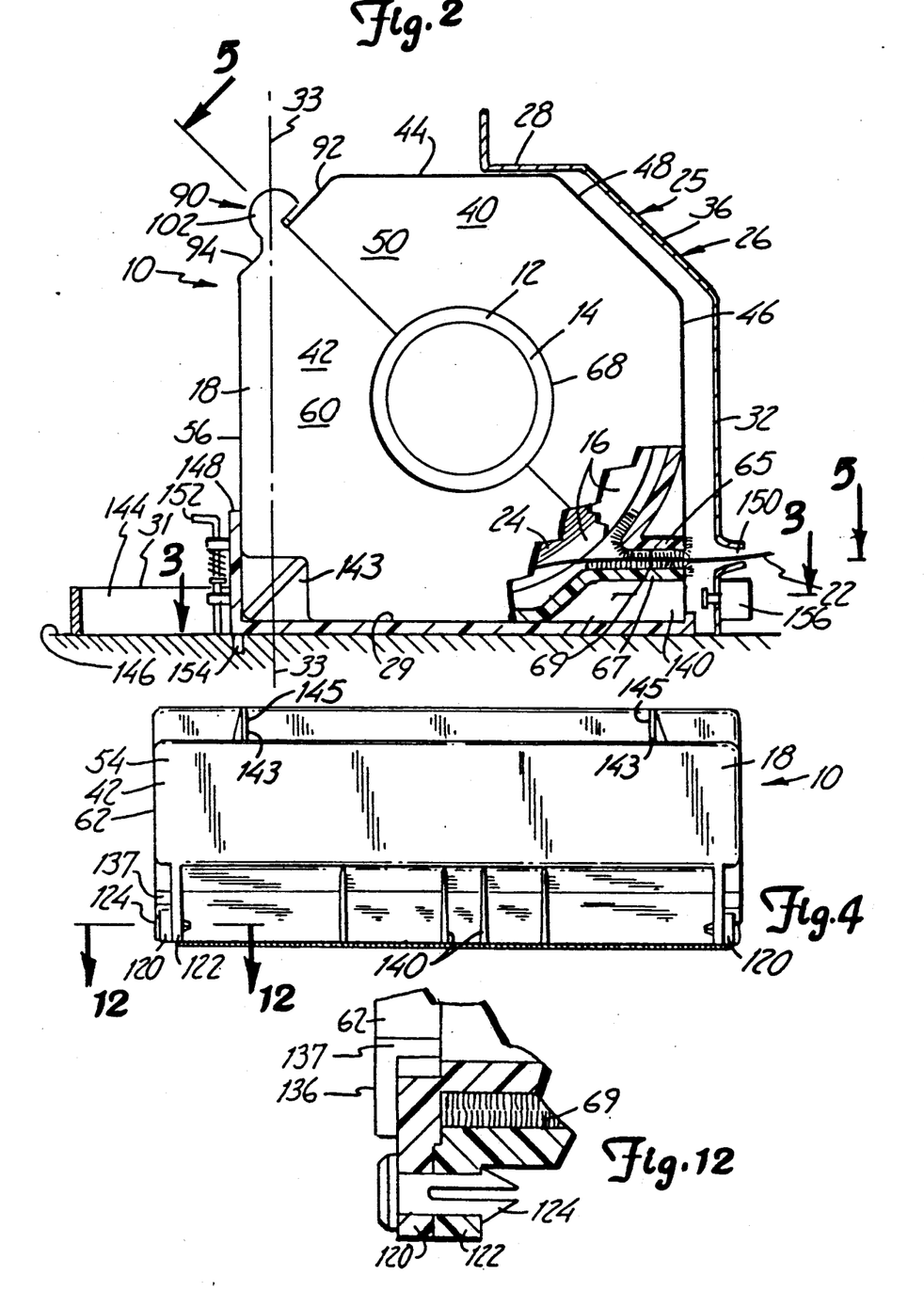
FIG. 2 is an enlarged end view of the cartridge of FIG. 1 with parts in section and parts broken away and disclosing the environment in which this cartridge has been designed to function, the view being from the left of the cartridge as seen in FIG. 1.
FIG. 4 is a bottom plan view of the dispenser cartridge of FIGS. 1, 2 and 3.
FIG. 12 is an enlarged vertical sectional view taken on line 12—12 in FIG. 4.
Figure 3:
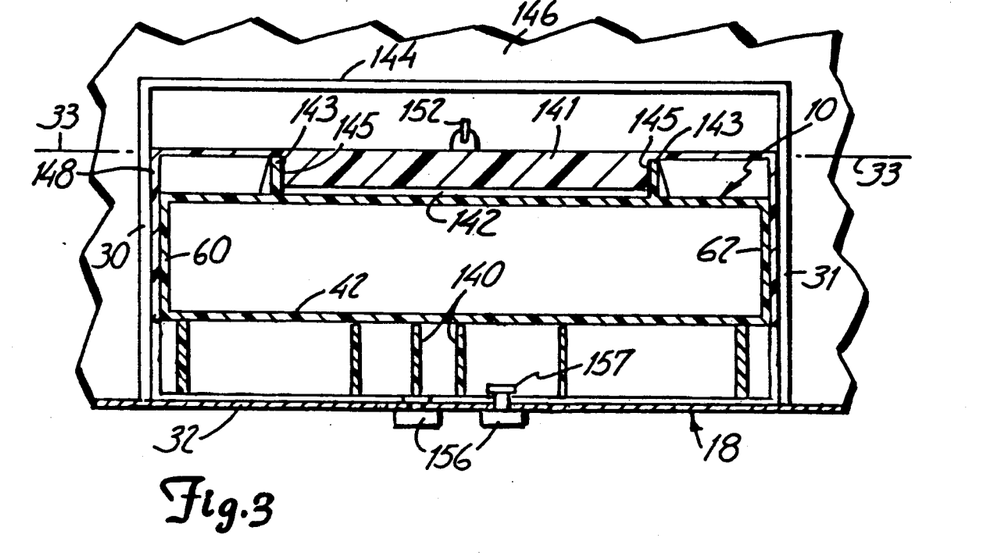
FIG. 3 is a horizontal sectional view taken approximately on the line 3—3 in FIG. 2 and showing a box-holding slide drawer and the dispenser in an operative position.

This particular dispenser cartridge 10 of the invention was designed to be used to serve as a supply source of web material 22 to be drawn as needed into a web material processing machine 25. In order to fit into that machine 25, the box 18 must have external dimensions such that it can be circumscribed by a right angular polyhedron or sexahedron of given dimensions. That is to say, this box 18 is designed to fit entirely within a design envelope 26 bounded by mutually parallel, upper and lower walls 28 and 29 of the machine 25, by end walls 30 and 31 situated at right angles to walls 28 and 29, by a forward side wall 32 of the machine, and by an imaginary rearward side wall 33 in parallel relation to the front side wall 32. These walls, including the positioning of imaginary rearward wall 33, are illustrated in FIGS. 2 and 3.

A further requirement in the design of this particular dispenser cartridge 10 due to the shape of machine 25 was the presence of a diagonal machine wall 36 situated in angular relationship to the forward side wall 32 and the upper wall 28 and in perpendicular relationship with respect to the first and second end walls 30 and 31 of the envelope 26. This further limitation of the shape of the design envelope 26 is best seen in FIG. 2.

While these necessary design parameters determine the shape of the dispenser cartridge 10 as illustrated and described, they do not in any way, of course, limit the broader aspects of the invention set out and claimed herein.

The box 18 is made up of a top section 40 and a bottom section 42. The top section includes an upper side wall 44 integrally connected with respect to a front side wall 46 through the instrumentality of a diagonal side wall 48. These upper, front and diagonal side walls are each integrally connected at right angles to a first upper end wall 50 and a second upper end wall 52 of the top section.

The bottom section 42 of the box 18 includes a lower side wall 54 integrally connected to a back side wall 56, and both of these side walls are integrally connected to a first lower end wall 60 and a second lower end wall 62.

In the form of the invention as shown, the top and bottom sections, 40 and 42, are releasably hingedly connectable to each other along a second side edge 64 of the box 18 diametrically opposite to the first side edge 21.

These top and bottom sections, between themselves, define the exit slot 20 along the first side edge 21 of the box. A top exit lip 65 of top section 40 runs in parallel, spaced relation to a bottom exit lip 67 of bottom section 42 beginning near the outermost edge of slot 20. These lips are each covered by a compressible strip 69 of velvet, felt or other suitable material to insure that no light can pass through the slot 20 even when web material 22 is being dispensed through it. Strips 69 can be secured to lip 65 and lip 67 using any suitable adhesive.

The design of the profile of the exit lips 65 and 67 with respect to each other, with respect to the positioning of hub 14 of spool 12, with respect to the maximum and minimum diameters of the roll 24, and with respect to the stiffness, thickness and other physical characteristics of the web material 22 will be such as to cause the force needed to dispense the web material to be as uniform as possible from the first movement of the material 22 from the cartridge 10 to the last end of the roll. To date, this has best been determined by experiment.

Figure 1:
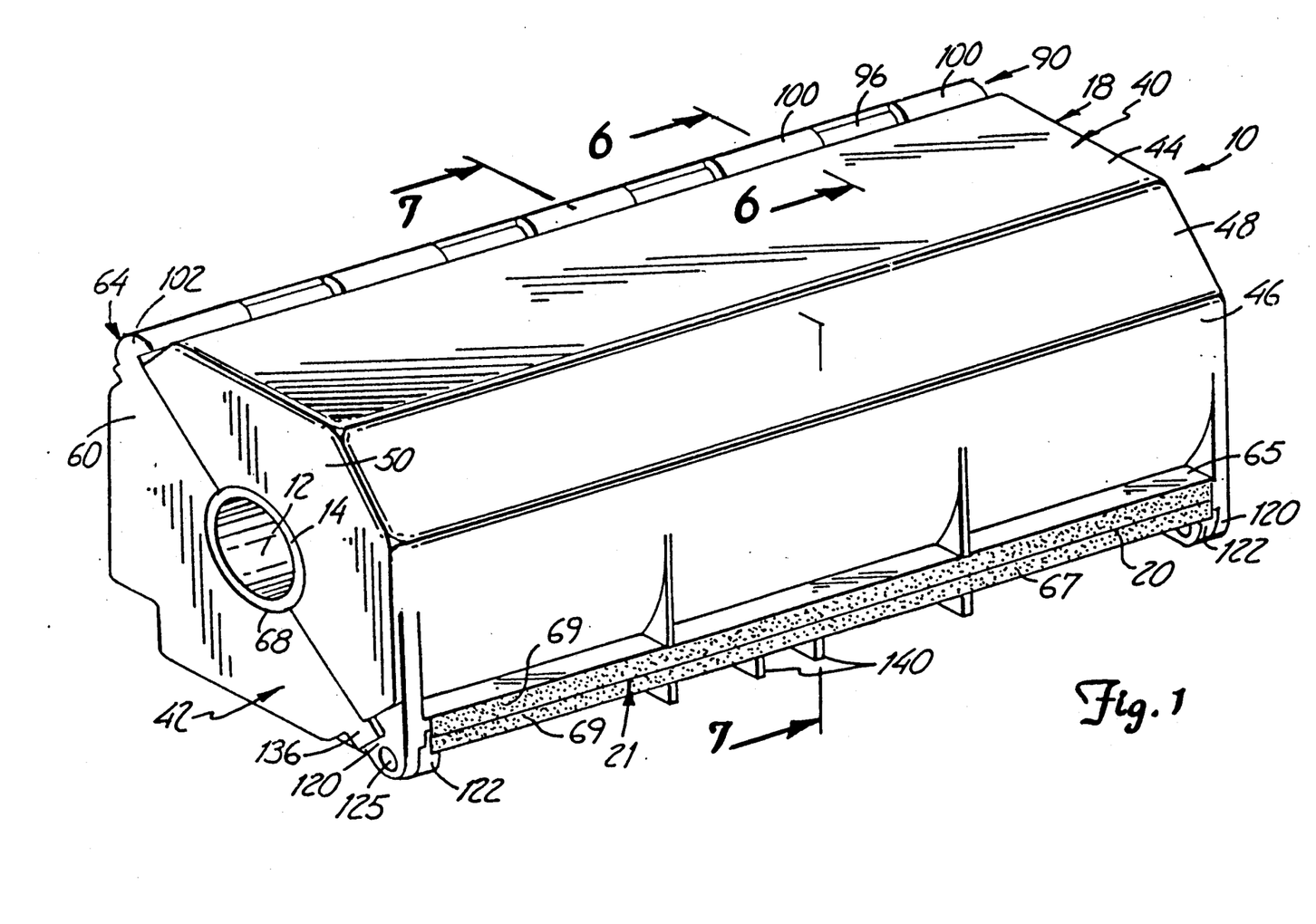
FIG. 1 is a perspective view of the outside of a dispenser cartridge made according to the present invention.
Figure 13:
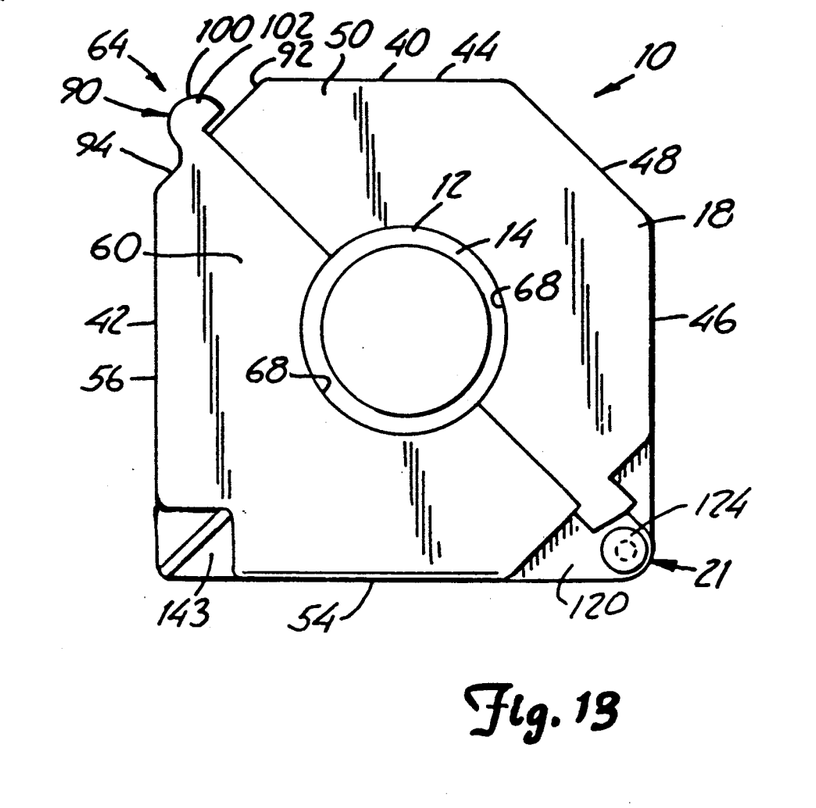
FIG. 13 is an enlarged end view of the cartridge as seen from the left in FIG. 1 and showing the true shapes of the top and bottom sections when mated to each other.

When the box 10 is assembled as seen in FIGS. 1, 2 and 13, it provides, with the spool 12, a light-tight chamber 66. With the parts so assembled, each pair of mating top and bottom section end walls, upper end wall 50 with lower end wall 60 and upper end wall 52 with lower end wall 62, have come together so as to be part of the enclosure of the cartridge light-tight chamber 66. Further, each mating pair of end walls provides a circular spool positioning opening 68. To be supported for easy rotational movement with no light leakage and for zero axial movement, the cylindrical hub 14 of the spool 12 extends slightly beyond each of the discoid end flanges 16,16 to be rotatably mounted in one of the circular, spool-positioning openings 68,68. The end flanges 16,16 are so positioned with respect to the end walls 50, 60 and 52, 62 so that no axial movement of spool 12 is possible.

Figure 5:
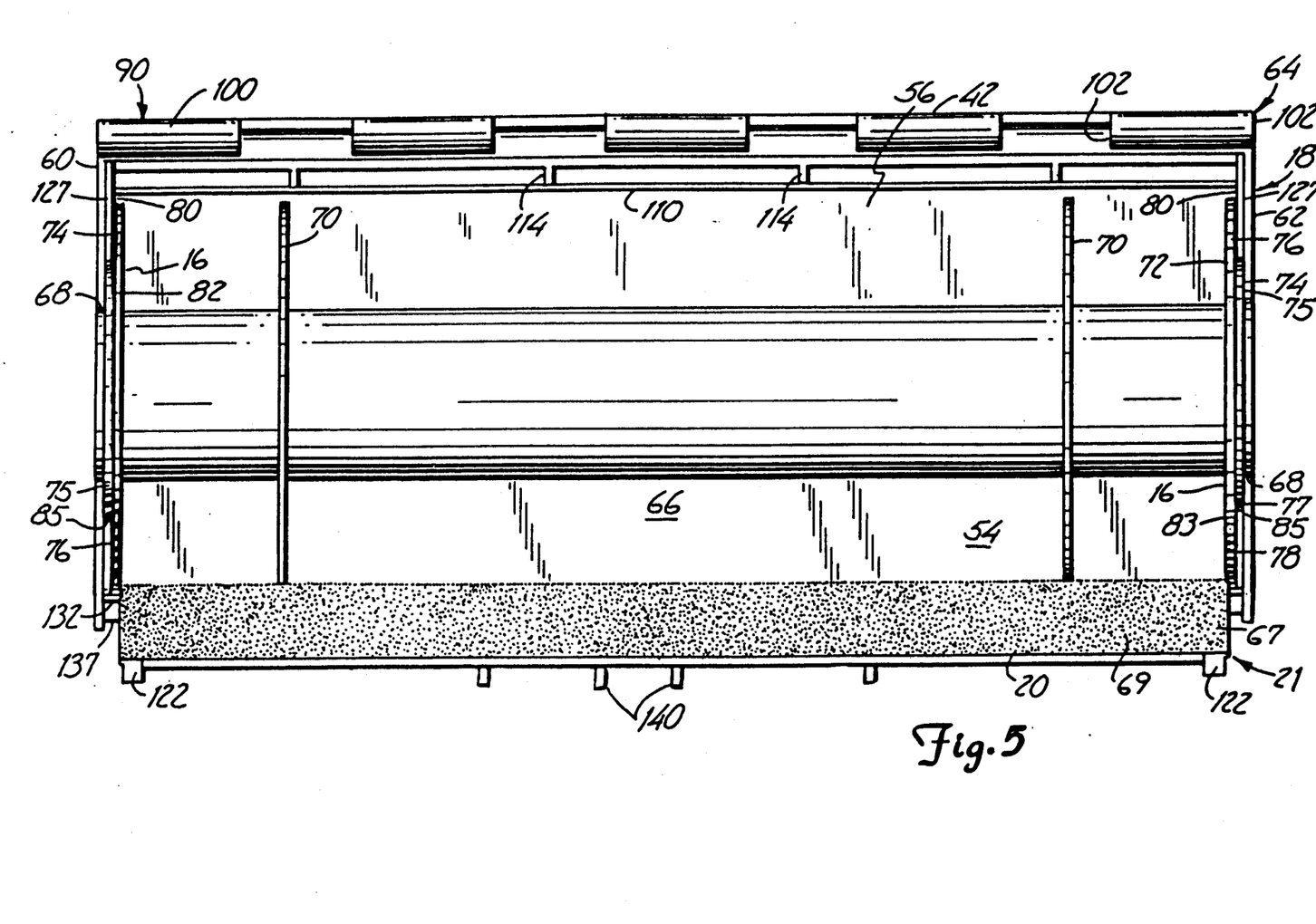
FIG. 5 is a sectional view taken on the line 5—5 in FIG. 2.

As seen in FIG. 5, two additional discoid-shape web material guide flanges 70,70 extend from hub 14, in perpendicular relation to its axis. The flanges 70,70 are spaced inwardly from the end flanges 16,16. These are for confining and guiding relatively narrow web material, say, for example, six inches wide, on a roll 24 on a central portion of the hub 14. Should it be desired that the dispenser cartridge 10 dispense a relatively wider web material 22, such, for example, as eight and one-half inches wide, a spool 12 will be used from which the additional guide flanges 70,70 have been omitted.

Having illustrated the structure necessary to accurately dispense a narrower strip of web material in FIG. 5, the remainder of the specification will deal with a dispenser cartridge utilizing a spool 12 in which the intermediate guide flanges 70,70 are omitted and on which a roll 24 of web material having the same width as the distance between inner surfaces 72,72 of the end flanges 16,16 is to be dispensed. These inner surfaces 72 of the end flanges 16,16 lie in planes which are precisely at right angles to the axis of the cylindrical hub 14 and fit precisely against the outer edges of the roll 24 and of the web material 22 so that the material dispensed will be exactly "on track" when it is dispensed through the light-tight exit slot 20.

Exterior surfaces 74 of each of the spool end flanges 16,16 define with its interior surface 72, a relatively thick inward disc 75 extending integrally outwardly from the hub 14 and a relatively thinner outward disc 76 extending integrally outwardly from the inward disc 75. Exterior surface 74 of each of the discs 16 includes an inward exterior surface 77 and an offset outward exterior surface 78. An interior surface 80 of each first upper end wall 50 and second upper end wall 52 of the top section 40 and of each the first lower end wall 60 and second lower end wall 62 of the bottom section 42 is made up of an inward semi-discoid surface 82 in adjacent concentric relation to part of the circular, spool-positioning opening 68, and an outward surface 83 inwardly offset from the outer edge of the inward semi-discoid surface 82 and extending out to meet with the interior surfaces of half of the side walls of the box 18.

Figure 11:
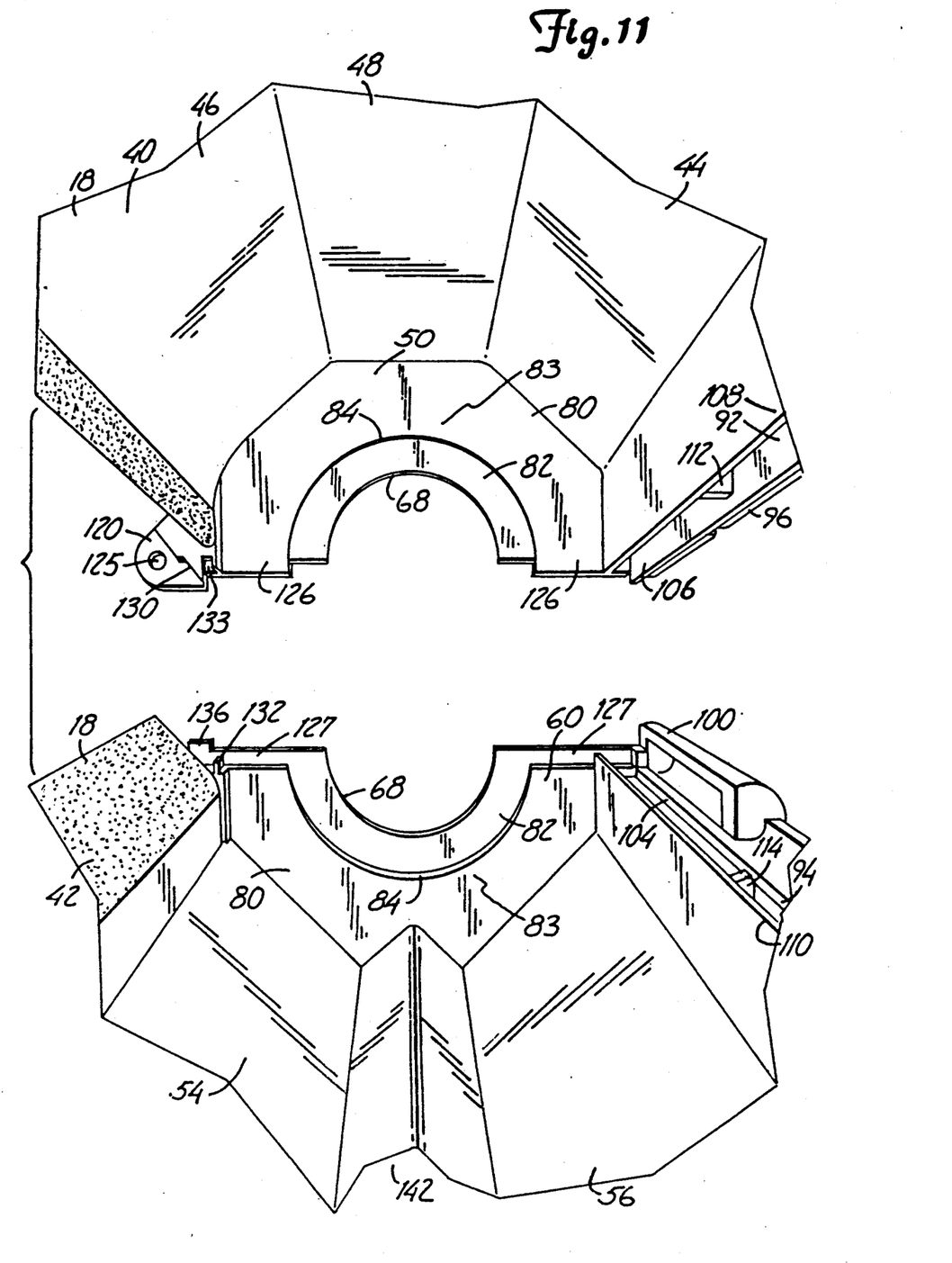
FIG. 11 is a third fragmentary exploded view of the top and bottom sections of the box but looking inside of the same end of the box as seen in FIGS. 9 and 10.

As will be understood from FIGS. 5 and 11, when the spool 12 and the box 18 are assembled together to provide an effective light-tight chamber 66, each of the inward exterior surfaces 77 of the relatively thick, inward disc 75 will be in matching contacting relation with the inward semi-discoid surface 82 of each of the interior surfaces of the end walls 50, 52, 60 and 62. Also, the outward exterior surface 78 of each end flange 16 will be in intimate contact with the outward surface 83 of each of these end walls. An offsetting semi-ringlike surface 84 between inward surface 82 and outward surface 83 will, when the dispenser is completely assembled, be in intimate congruent contacting relation to an offsetting semi-ringlike surface 85 between each inward exterior surface 77 and outward exterior surface 78 of the flanges 16.

While many plastic or other materials would suffice, acrylonitrile butadiene styrene, also known as ABS, is a preferred material for making the spool 12 and box 18. Because of its light absorbing qualities, black is the preferred color.

In order to properly guide the web material as it is dispensed and in order to properly support the roll 24 in place, the interior surfaces 72 of the flanges 16 are precisely at right angles to the axis of the hollow cylindrical hub 14. However, the exterior surfaces 74 including the inward exterior surfaces 77 and the outward exterior surfaces 78 can be tapered slightly radially outwardly toward the interior surfaces 72 for ease of manufacture. The amount of any such taper will be exactly duplicated in reverse by the interior surfaces 80 including inward semi-discoid surface 82 and outward surface 83.

Because of the extreme sensitivity to light of some of the web materials which are to be dispensed by the cartridge of the invention, the cartridge must often be initially loaded in conditions of extremely low, or non-existent, ambient light. Because of this, the top and bottom sections must be capable of being hingedly connected to each other in no light or very low light. When the box is loaded with the spool and roll of web material inside and closed, the hinge means must be light tight. For these reasons, the hinge means 90 of the present invention was developed. Because of the constraints of the design envelope 26 discussed above, a top section hinge wall 92 extends integrally downwardly at an acute angle from upper side wall 44 and from the first and second upper end walls 50 and 52; and a bottom section hinge wall 94 extends integrally inwardly at an acute angle from back side wall 56 and from the first and second lower end walls 60 and 62. Extending outwardly from a lower edge portion of the top section hinge wall 92 are a plurality of spaced-apart barrel-like projections 96 each consisting of a part-cylindrical hinge pin part 97 and a connecting part 98 connecting the hinge pin part 97 to a bottom edge portion of the hinge wall of the top section hinge wall 92.

To receive these part-cylindrical "hinge pins" 97, a plurality of mating hinge pin receptacles 100 extend integrally from a top edge portion of the bottom section hinge wall 94, each in alignment with one of the projections 96. Each hinge pin receptacle 100 provides a part-cylindrical cavity 101. When the top and bottom sections are hingedly connected, each cavity is congruent to its part-cylindrical hinge pin part 97. To insure exact longitudinal alignment of the sections with each other, each hinge pin receptacle 100 is provided with end walls 102,102 positioned so that the part cylindrical parts 97 of the projections 96 cannot enter into the part cylindrical opening 101 of the hinge pin receptacles until these top and bottom sections 40 and 42 are in such perfect longitudinal alignment.

Figure 6:
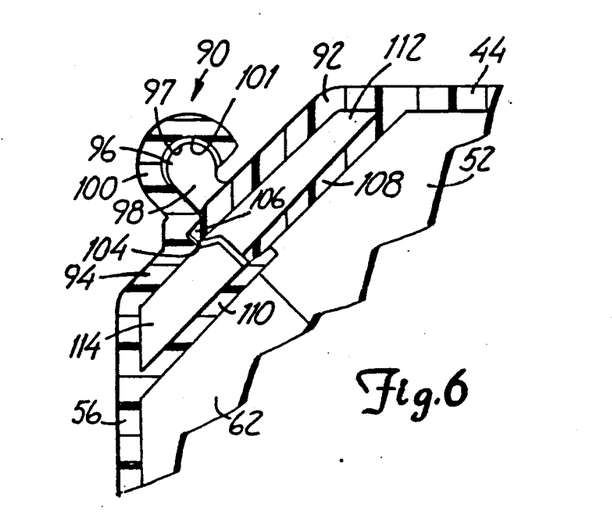
FIG. 6 is an enlarged vertical sectional view taken on the line 6—6 in FIG. 1.

Primary and secondary light seals are provided in connection with hinge means 90. The primary light seal includes a longitudinally extending recess 104 provided in an uppermost portion of the bottom section hinge wall 94. This is most clearly identified in FIGS. 7 and 8 and is shown in larger detail in FIG. 6. A horizontal bar 106 extends integrally downwardly from a lowermost portion of the top section hinge wall 92 below the spaced-apart barrel-like projections 96 and is in position so that when the top and bottom sections are completely mated to each other, the bar 106 is held in tension against the wall of the recess 104 forming an effective light-tight seal. This horizontal bar 106 can be seen in FIGS. 7 and 8, and the light-tight sealing action is best seen in FIG. 6.

In order to provide stability to this upper edge of the box 18 and to block any light which might pass through this primary light seal due to unintended deflection of the side walls of the top section toward the bottom section, a secondary light seal and strengthening structure is provided. For this purpose, a slightly tapered top light baffle 108 extends downwardly from the upper side wall 44 of the top section 40 of the box 18 in spaced, substantially parallel relationship to the top section hinge wall 92; and a slightly tapered bottom light baffle 110 extends integrally upwardly from the back side wall 56 of bottom section 42 in substantially parallel relationship to the bottom section hinge wall 94.

Figure 9:
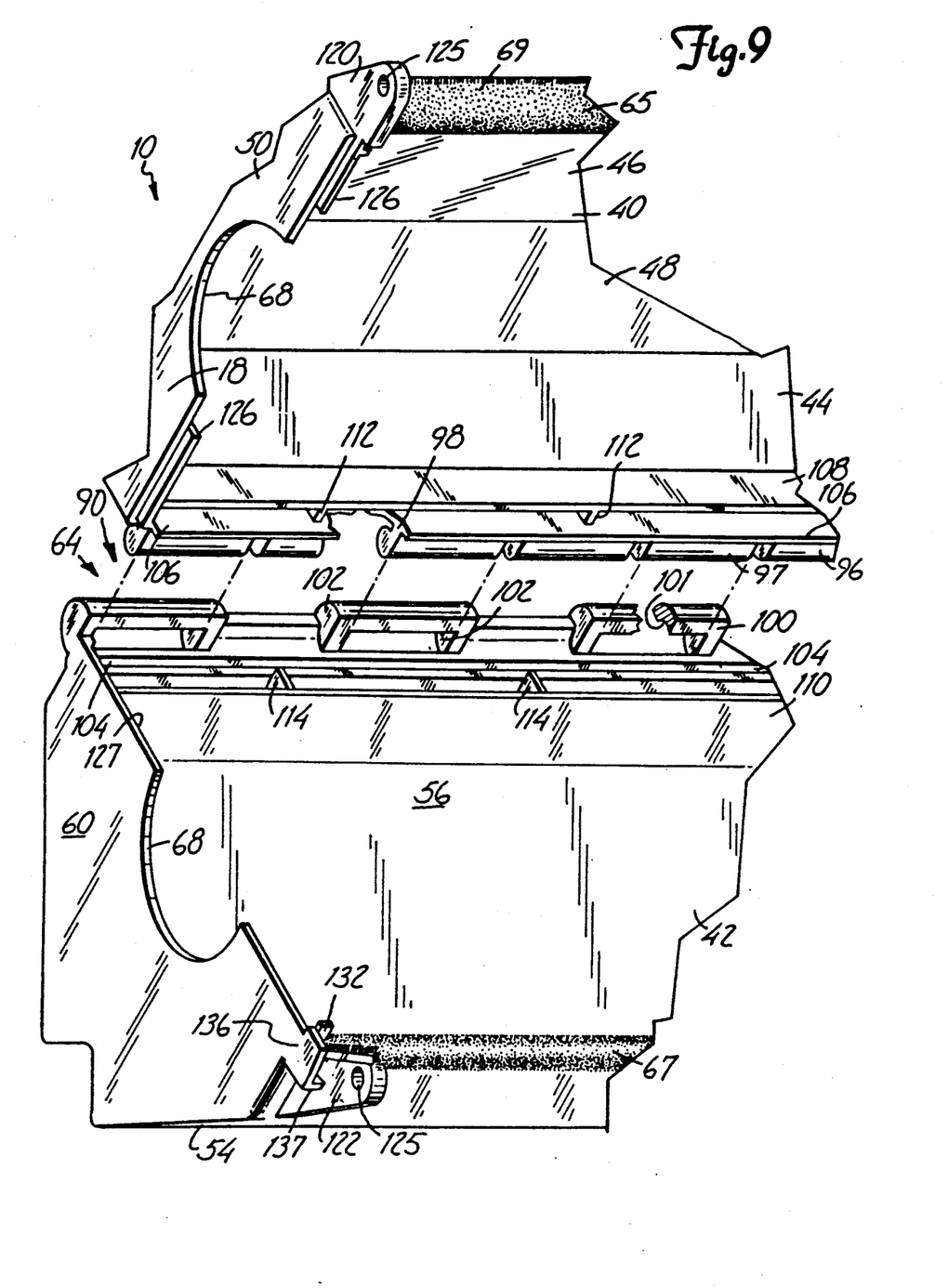
FIG. 9 is a first fragmentary exploded view of end portions of the top and bottom sections of the box of the dispenser as seen from the left in FIG. 1 and illustrating, among other things, the relative alignment of cooperating hinge elements.

A plurality of top baffle reinforcing ribs 112 extend integrally between the top light baffle 108 in the top section hinge wall 92. Similarly, a plurality of bottom baffle reinforcing ribs 114 extend between bottom light baffle 110 and bottom section hinge wall 94. The positioning of these bottom ribs 114 is clearly seen in FIGS. 5, 6, 9 and 10. Top ribs 112 are in alignment with the bottom ribs 114 when the box is assembled. The positioning of top ribs 114 can also be seen in FIG. 9. These reinforcing ribs 112 and 114 support the light baffles 108 and 110, respectively, to insure that a firm secondary light shield is formed when the top section 40 is moved down into full mating relationship with respect to the bottom section 42.

Figure 7:
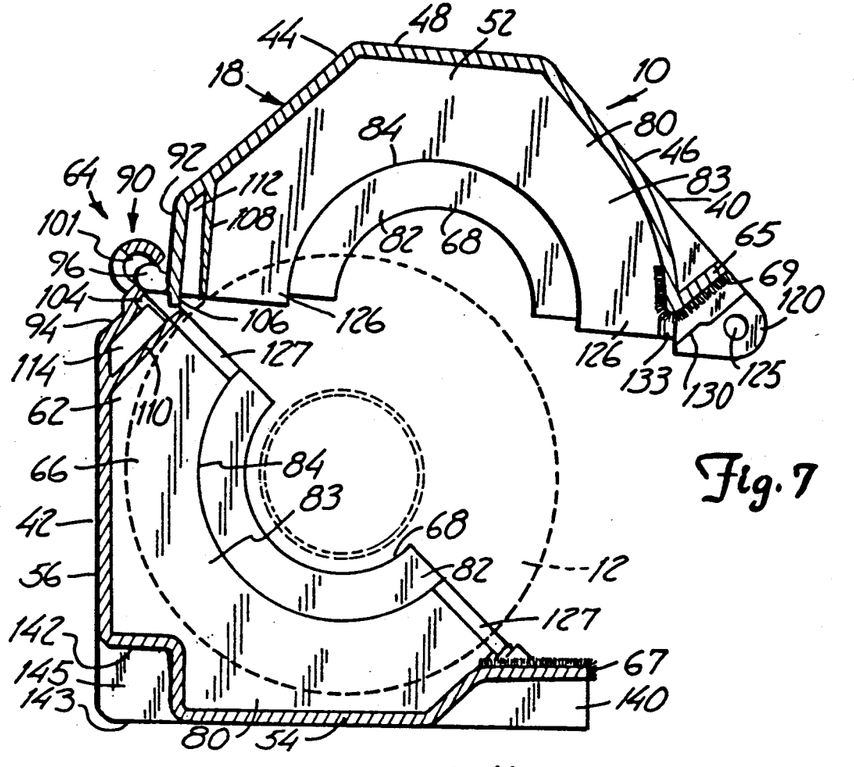
FIG. 7 is an enlarged sectional view taken on the plane 7—7 in FIG. 1 but showing a top section of a light-tight box of the dispenser in the process of being hingedly connected to a bottom section thereof.
Figure 8:
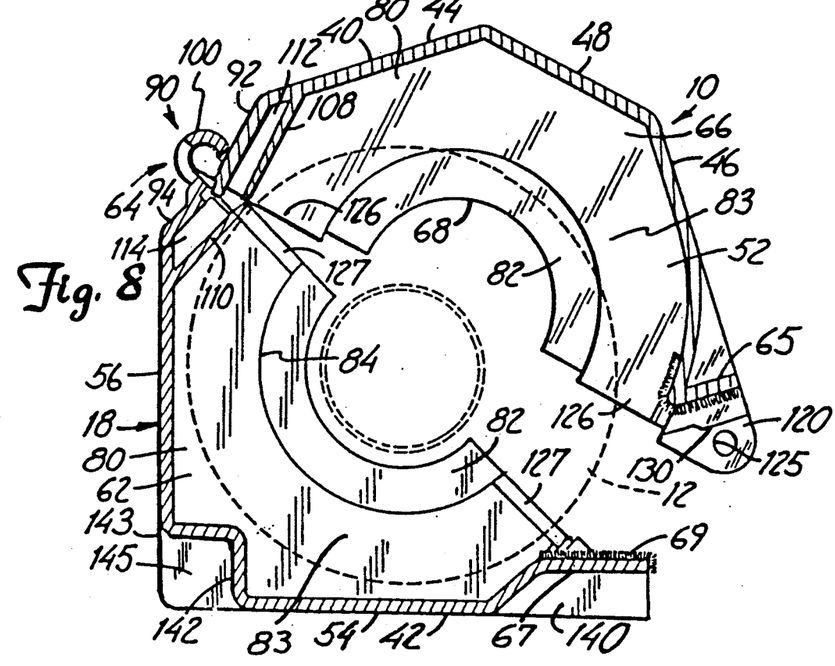
FIG. 8 is also an enlarged sectional view taken on the plane 7—7 in FIG. 1, but showing a further progression in the coupling of the top section to the bottom section of the box.

As seen in FIG. 7, the bottom end of the top light baffle 108 is initially out of alignment with the top end of the bottom light baffle 110 as the barrel-like projections 96 are first being placed into the part cylindrical cavities 101 of the hinge pin receptacles 100. After each of the part cylindrical hinge pins 97 of the projections 96 is concentrically related with respect to its part cylindrical cavity 101 in the receptacle 100, the bottom end of baffle 108 comes into interfering relation with respect to the top end of the bottom baffle 110. This is shown in FIG. 8.

As the top section 40 continues its movement down toward the bottom section 42, the flexibility of the ABS material and the slight taper in the light baffles allows the bottom end of the top baffle 108 to collide with the bottom baffle 110 to slightly deflect the bottom baffle to allow them each to be under slight compression when they reach the overlapping and light trap relationship seen in FIG. 6.

These ribs and baffles strengthen the top side walls and the bottom side walls of the box sufficiently so that no unintentional or other weight or pressure placed on the box will result in sufficient deflection of the side walls to permit light to enter the light-tight chamber 66.

When the dispenser cartridge has been loaded, the web material 22 to be dispensed will extend a short distance from the exit slot 20 as seen in FIG. 2. At that point, in order to prevent the two sections from coming apart, they are releasably fastened together. Top lugs 120,120 each extend outwardly from the first side edge 21 of the box 18 in about the same plane as the upper end walls 50 and 52, respectively; and bottom lugs 122,122 extend outwardly from first side edge 21 in about the same plane as lower end walls 60 and 62, but each is positioned to be in contacting overlapping relation to one of the lugs 120 when the box is assembled. With the cartridge 10 loaded and with the top and bottom sections fully mated as seen in FIGS. 1, 2, 4 and 13, resilient clips 24 are inserted through provided openings 125 in each pair of lugs to hold the sections in position until the web material has been completely dispensed or until the cartridge is to be reloaded. See FIG. 12.

In order to provide an effective light trap between the upper end wall 50 and lower end wall 60 and between upper end wall 52 and the lower end wall 62, each top end wall is provided with a pair of interior ledges 126,126, each extending integrally downwardly from one of the top end walls; and each bottom end wall is provided with a pair of interior upwardly open recesses 127,127 to receive those ledges. Thus any light entering between the top end walls and the bottom end walls will be trapped by ledges 126 and recesses 127. Light moving in direction of the face of these end walls will, in direction up and to the left in FIGS. 6, 7 and 8, impinge on the light baffles 112 and 114; and, in direction toward the spool hub, will be directed into an end flange 16.

Figure 10:
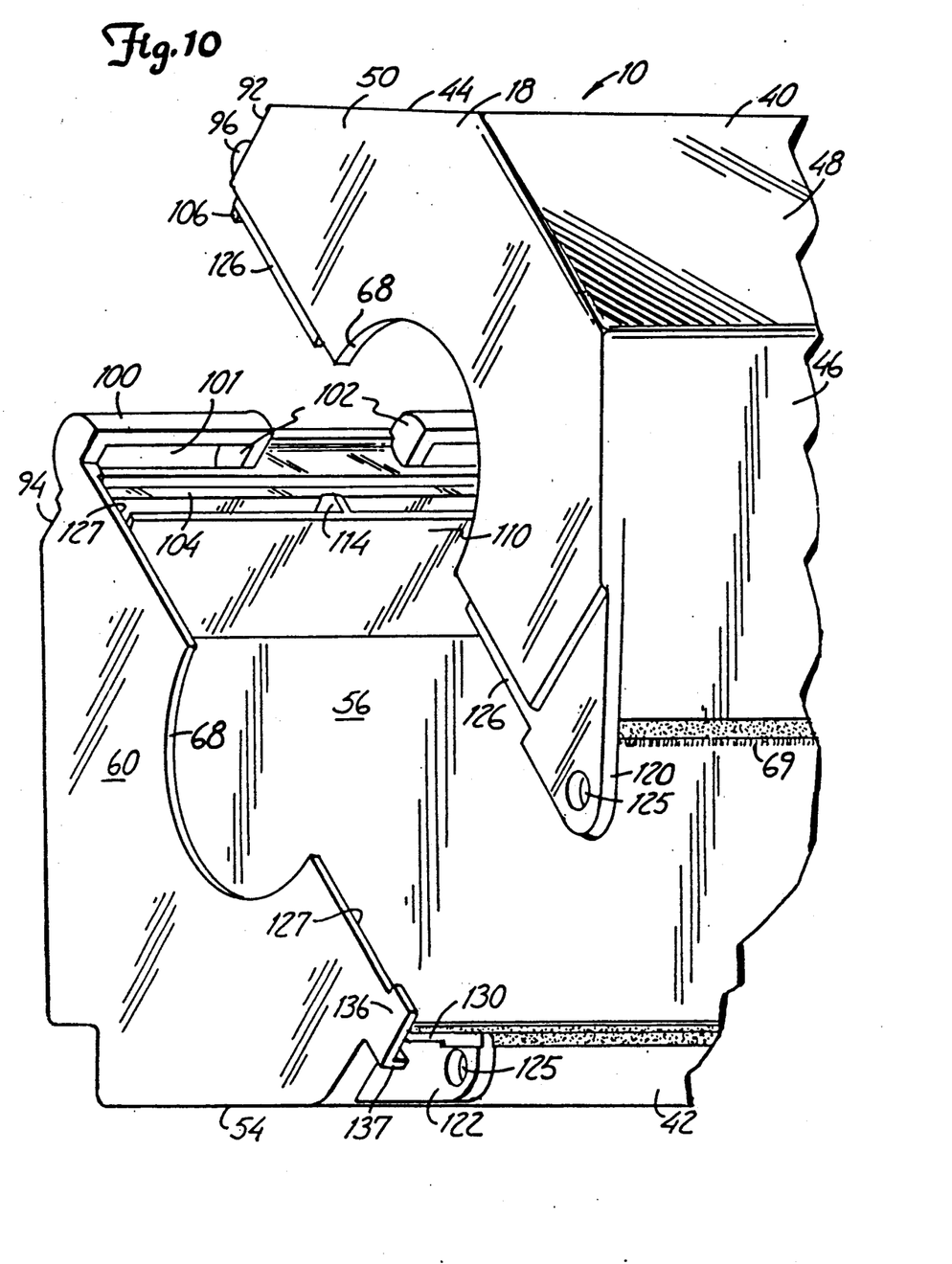
FIG. 10 is a second fragmentary exploded view of the same end portions of the top and bottom sections of the box as seen in FIG. 9 but illustrating the relative positioning of certain light block features adjacent to the dispenser exit slot and elsewhere.

Outside light tending to pass between a top lug 120 and a bottom lug 122 will encounter a light step 130. The true shape of this light step on a top lug 120 is clearly seen in FIGS. 7 and 8 and is obliquely shown on FIG. 11. An oblique showing of the light step 130 on a bottom lug 122 is seen in FIG. 10. On the top lug 120, the portion of the lug on the side of the step 130 including opening 125 is of reduced thickness; and that part of the bottom lug 122 on the side of the light step 130 away from the opening 125 is of reduced thickness. When a bottom and top lug are put together, therefore, any light coming between them will encounter the light step 130. Any light traveling along the light step 130 in direction toward the spool will be blocked by a boss 132 extending upwardly from the bottom end wall into a boss alignment notch 133 in the top section 40. See FIG. 11.

To prevent light from coming into the exit slot 20 from the end, the bottom lugs 122 are each provided with an end plate 136, each end plate being a continuation of the lower end walls 60 or 62. Each end plate 136 has a bottom wall 137 which extends integrally into the bottom lug 122 to block light coming from that direction. This structure is best seen in FIGS. 1 and 13.

Once the dispensing cartridge 10 is loaded with a certain type and width of light-sensitive web material 22, there must be some way of indicating the character and size of the web material inside. Therefore, the front bottom edge of each bottom section 42 of each cartridge is provided with a number and/or arrangement of downwardly extending identifying fins 140 identifying from the outside the particular character and size of the web material 22 inside.

In order to load a dispensing cartridge 10 into the web material processing machine 25, a fixed tray 144 is mounted on a processing machine base floor 146. Tray 144 has three sides and is fixedly mounted with respect to the forward wall 32 of the machine 25. See FIG. 3. A sliding drawer 148, also having three closed sides plus a relatively open side facing the wall 32, is placed in the tray 144 and slid back in contact with the rear wall of the tray.

As best seen in FIG. 3, the back wall of drawer 148 includes a cartridge positioning block 141. As clearly seen in FIGS. 2 and 13, and as perhaps most clearly understood from FIGS. 7 and 8, a positioning block receiving recess 142 is provided at the integral connection between lower side wall 54 and back side wall 56 of the cartridge bottom section 42. Two cartridge box positioning tabs 143, 143, parallel with lower end side walls 60 and 62, extend into recess 142 to have mutually parallel facing surfaces 145, 145. Mutually parallel end surfaces of the cartridge positioning block 141 are spaced apart the same distance as are surfaces 145 of the positioning tabs 143.

With the tabs 143 aligned on each side of the ends of block 141, the cartridge 10 can be put into the drawer resting on the lower wall 29 which is the bottom of the drawer. The drawer and cartridge will then be slid forward toward the wall 32. An intermediate position just before the cartridge reaches the wall 32 is pictured in FIG. 2. At this point, the very slightly upwardly curled web material 22 will have entered an opening slot 150 in the wall 32. As the cartridge and drawer move to the right as seen in FIG. 2, a spring-loaded pintle 152 will enter a detente 154 in the base floor 146 fixing the drawer 148 and cartridge 10 in position where machine 25 can access the projecting end of the web material 22 and pull it from cartridge 10 as needed.

This is the positioning of the parts as seen in FIG. 3. In both of FIG. 2 and FIG. 3, microswitches 156 are shown connected to the wall 32 with a switch operating lever 157 extending in direction toward the cartridge. As seen in FIG. 3, the microswitch to the left has been activated by a fin 140, and the microswitch to the right has not been activated. This is by way of example to indicate that the identifying fins 140 were "read" by the microswitches, and, the energization of the one to the left and the non-energization of the one to the right has indicated to the processing machine 25 the character and size of the material it will be processing if it uses this particular cartridge.

Although the present invention has been described with reference to preferred embodiments, workers skilled in the art will recognize that changes may be made in form and detail without departing from the spirit and scope of the invention.

What is claimed is:

1. In an opaque dispenser cartridge providing a light-tight chamber from which to dispense a roll of light sensitive web material, the cartridge having (1) a spool including a cylindrical hub initially supporting the roll of material to be dispensed and a pair of discoid end flanges concentric with the hub, one positioned at each end of the roll, and (2) a hollow box encompassing the spool, said box being provided with a straight light-tight exit slot through which the web material can be dispensed from the spool; the improvement wherein:

(a) the outside dimensions of the box define a right angular polyhedron and the box is made up of a top section and a bottom section defining the light-tight exit slot along a first side edge of the box, these sections being connectable to each other to form a light-tight seal along an oppositely positioned second side edge of the box;

(b) each section is provided with side wall means of size and configuration to encompass about one-half of the spool and each section includes a pair of end walls, an end wall of each pair being integrally connected to one end of the side wall means of that section, every end wall being in position and of configuration to mate with a corresponding end wall of the other section to form a light-tight seal serving as part of the enclosure of the light-tight chamber; and (c) means is provided in the box to support the spool within the chamber to position and maintain the longitudinal axis of the spool hub in parallel relation to the straight exit slot.

2. The dispenser cartridge of claim 1 wherein:

(d) the side wall means of the top box section includes an upper side wall and a front side wall, the upper side wall lying at least partly in a generally horizontal plane, and being integrally connected with respect to the front side wall which lies at least partly in a generally vertical plane;

(e) the side wall means of the bottom box section includes a lower side wall and a back sidewall, the lower side wall lying at least partly in a generally horizontal plane, and being integrally connected with respect to the back side wall which lies at least partly in a generally vertical plane;

(f) the straight light-tight exit slot along the first side edge of the box lies between the top section front side wall and the bottom section lower side wall;

(g) the bottom section back side wall and the top section upper side wall are connectable to each other along the second side edge of the box; and (h) each top section end wall mates with one of the bottom section end walls along a plane extending generally between the first side edge and the second side edge of the box when the top and bottom sections are connected to each other along said second side edge and the top section front side wall and bottom section lower side wall are assembled together to form the exit slot.

3. The dispenser cartridge of claim 2 wherein:

(i) hinge means is provided to selectively connect the top and bottom sections to each other generally along the second side edge of the box to form a light-tight seal, and to disconnect the top and bottom sections from each other.

4. The dispenser cartridge of claim 3 wherein:

(j) said top section upper side wall includes a top section hinge wall extending at an acute angle downwardly from a horizontal portion of the upper side wall, and said bottom section back side wall includes a bottom section hinge wall extending at an acute angle inwardly from a vertical portion of the back side wall;

(k) a first of said hinge walls terminates in a horizontally extending bar and the second of said hinge wall is provided at its terminal end portion with a horizontally extending recess positioned to receive said bar to form a light seal when the top and bottom sections are fully assembled together;

(l) a plurality of spaced apart, part cylindrical hinge pin projections extend outwardly from said first hinge wall in direction away from said first side edge of said box;

(m) a plurality of spaced apart hinge pin receptacles extend from said second hinge wall in direction away from said first side edge of the box, each receptacle providing a part cylindrical cavity open to receive an aligned hinge pin projection; and (n) the hinge pin receptacles and projections being of shape and position such that after each projection is received into the receptacle cavity, the sections rotate with respect to each other on the cylindrical axis of the hinge pins to bring the hinge wall bar and hinge wall recess into light blocking relation to each other and to bring each of the top section end walls into fully assembled, mating, light blocking relation with respect to one of the bottom section end walls.

5. The dispenser cartridge of claim 3 wherein:

(j) said top section upper side wall includes a top section hinge wall extending at an acute angle downwardly from a horizontal portion of the upper side wall, and said bottom section back side wall includes a bottom section hinge wall extending at an acute angle inwardly from a vertical portion of the back side wall;

(k) a first of said hinge walls terminates in a horizontally extending bar and the second of said hinge wall is provided at its terminal end portion with a horizontally extending recess positioned to receive said bar to form a light seal when the top and bottom sections are fully assembled together;

(l) at least one part cylindrical hinge pin projection extends outwardly from said first hinge wall in direction away from said first side edge of said box;

(m) at least one hinge pin receptacle extends from said second hinge wall in direction away from said first side edge of the box, the hinge pin receptacle providing a part cylindrical cavity open to receive the hinge pin projection; and (n) the hinge pin receptacle and the hinge pin projection are of shape and position such that after the projection is received into the receptacle cavity, the top and bottom sections rotate with respect to each other on the cylindrical axis of the hinge pin to bring the hinge wall bar and hinge wall recess into light blocking relation to each other and to bring the top section end walls into fully assembled, mating, light blocking relation with the bottom section end walls.

6. The dispenser cartridge of claim 4 wherein:

(o) the first and second hinge walls lie in generally parallel aligned relation to each other when the top and bottom sections of the box have been fully assembled to each other;

(p) a top light baffle extends from the interior surface of the top section upper side wall in approximately parallel relation to the top section hinge wall and is in integral, light blocking relation to said upper side wall and to the top section end walls;

(q) a bottom light baffle extends from the interior surface of the bottom section back side wall in approximately parallel relation to the bottom section hinge wall and is in integral, light blocking relation to said back side wall and to the bottom section end walls;

(r) these baffles have horizontal terminal end portions so positioned that as the top and bottom section rotate with respect to each other toward assembled relation, said terminal end portions come into interfering relation to each other, there being sufficient resiliency between the two baffles so that as the sections move into final mating position, the baffles end portions rub past each other and end up resting against each other to from a secondary hinge means light-tight seal.

7. The dispenser cartridge of claim 6 wherein:
(s) a plurality of spaced apart baffle support ribs extend between at least one of the baffles and its hinge wall to support the baffle to make the secondary light-tight seal more secure and to stiffen the box against unacceptable deformation of its side walls when loaded with the web material.

8. The dispenser cartridge of claim 2 wherein:
(i) each end wall is provided with a semi-circular opening which cooperates with the opening in its mated end wall and the openings in the other pair of mated end walls to form positioning bearing means for the spool having the same inside diameter as the outside diameter of outer end portions of the cylindrical spool hub; and
(j) the spool support means includes the bearing means and those outer end portions of the spool.

9. The dispenser cartridge of claim 8 wherein:
(k) the discoid end flanges are positioned on the spool hub to lie in immediately adjacent, light-tight relation to their respective end walls when the cartridge is assembled;
(l) two interior ledges extend integrally radially away from a first end wall of each pair of mated top section and bottom section end walls, and two interior open recesses are provided in a second end wall of each pair of those end walls, each to mate with a such interior ledge, all to provide a light trap extending from an intermediate position between the spool hub and the outside of a discoid end flange and positions adjacent to the first and second side edges of the box.

10. The dispenser cartridge of claim 9 wherein:
(m) the interior surface of each end flange lies in a plane normal to the axis of the spool hub;
(n) the exterior surface of each end flange is offset to provide a relatively thick inward disc extending radially outwardly from the hub and a relatively thinner outward disc extending outwardly from the outer edge of the thick inward disc to the outer edges of the flange; and
(o) the interior surfaces of the end walls adjacent each flange are recessed in the area of the relatively thick inner disc so that the entire exterior surface of each end flange is in intimate, contacting, light trapping relation with respect to the interior surfaces of its adjacent end wall.

11. The dispenser cartridge of claim 10 wherein:
(p) the interior ledges and recesses of the end walls terminate at their inner ends at the outer edges of the relatively thick inward discs of their respective flanges.

12. The dispenser cartridge of claim 2 wherein:
(i) means is provided for maintaining the top and bottom box sections in assembled relation with respect to each other, said means including:
  (1) a pair of top lugs, each extending integrally from one of the top section end walls to overlie one end of the exit slot,
  (2) a pair of bottom lugs, each extending integrally from one of the bottom section end walls to be superposed and in contact with an interior surface portion of one of the top lugs when the cartridge is fully assembled, and
  (3) means to maintain the top and bottom lugs in mutually fixed, superposed relation to each other.

13. The dispenser cartridge of claim 12 wherein:
(j) the means to maintain the top and bottom lugs in mutually fixed, superposed relation to each other includes mutually aligned openings provided through at least one pair of superposed lugs, and a clip passing through said pair of mutually aligned openings.

14. The dispenser cartridge of claim 11 wherein:
(q) means is provided for maintaining the top and bottom box sections in assembled relation with respect to each other, said means including:
  (1) a pair of top lugs, each extending integrally from the top section end walls to overlie one end of the exit slot,
  (2) a pair of bottom lugs, each extending integrally from one of the bottom section end walls to be superposed and in contact with an interior surface portion of one of the top lugs when the cartridge is fully assembled, and
  (3) means to maintain the top and bottom lugs in mutually fixed, superposed relation to each other, said means including mutually aligned openings provided through each pair of superposed lugs, and a clip passing through each such pair of mutually aligned openings.

15. The dispenser cartridge of claim 14 wherein:
(r) an exterior face of each of the bottom lugs is in intimate contacting relationship with respect to an interior face of one of the top lugs;
(s) the mutually contacting faces of each of the lugs is cut away to provide light step means to block the passage of light between these two contacting surfaces in direction toward the interior of the light-tight chamber;
(t) to provide this light step means:
  (1) a portion of the top lug including the opening provided therethrough is thinner than the remainder of the lug, and an exactly superposed portion of the bottom lug is thicker than the remainder of the bottom lug,
  (2) the top lug is provided with a light step extending across the face of the lug in the form of a line of demarcation between its thinner portion and its thicker portion, and the bottom lug is provided with a similar light step in the form of a line of demarcation between the thicker part and the thinner part of the bottom lug, that light step being in contacting relation to the top lug light step when the cartridge is assembled.

16. The dispenser cartridge of claim 15 wherein:
(u) the light step demarcation line includes two substantially mutually parallel, spaced apart, approximately horizontal, outer portions connected by a relatively short center portion extending at an acute angle with respect to the two outer portions.

17. The dispenser cartridge of claim 15 wherein:
(u) a plate extends integrally outwardly from, and parallel to, each of the bottom end walls and is spaced from an exterior surface of a bottom lug sufficiently so as to allow the top lug to pass between the bottom lug and the plate, the plate being in position to block any light from entering toward the light-tight chamber at the areas of connection between the top section and top lug and between the bottom section and bottom lug;
(v) said plate being provided with an integral bottom wall which is integrally connected to the exterior surface of a bottom lug below the position occupied by the top lug when the cartridge is fully assembled.

18. The dispenser cartridge of claim 14 wherein:
(r) a first of each pair of mated top and bottom section end walls is provided with a light blocking and alignment boss extending integrally in direction toward a second of said end walls from a position adjacent the connection between the lugs and the end walls and at the outer termination of the mated ledges and recesses, and the second of such end walls is provided with an alignment notch to receive the boss.

* * * * *